United States Patent
Manders et al.

(10) Patent No.: US 6,471,286 B1
(45) Date of Patent: Oct. 29, 2002

(54) OPEN ROOF CONSTRUCTION FOR A VEHICLE

(75) Inventors: Peter Christiaan Leonardus Johannes Manders, Horst; Theodorus Gerardus Fransiscus Van Rooij, As Son En Breugel, both of (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/530,004

(22) PCT Filed: Jul. 20, 1999

(86) PCT No.: PCT/NL99/00469

§ 371 (c)(1),
(2), (4) Date: Apr. 21, 2000

(87) PCT Pub. No.: WO00/06403

PCT Pub. Date: Feb. 10, 2000

(30) Foreign Application Priority Data

Jul. 30, 1998 (NL) .............................................. 1009773
Apr. 22, 1999 (NL) .............................................. 1011863

(51) Int. Cl.⁷ ................................................. B60J 7/05
(52) U.S. Cl. ..................................... 296/223; 296/221
(58) Field of Search .................................. 296/221–224

(56) References Cited

U.S. PATENT DOCUMENTS

| 4,417,763 A | 11/1983 | Schlapp et al. | |
| 4,619,480 A | 10/1986 | Motoyama et al. | 296/217 |
| 4,647,104 A | 3/1987 | Kohlpaintner et al. | 296/221 |

(List continued on next page.)

FOREIGN PATENT DOCUMENTS

| DE | 3442600 A1 | 5/1986 | |
| DE | 3930756 | * 3/1991 | ................. 296/221 |
| DE | 9116412 U | 2/1993 | |
| DE | 4405742 C1 | 5/1995 | |
| DE | 195 14 585 | 10/1996 | |
| EP | 0033816 A1 | 8/1981 | |
| EP | 0 143 589 | 6/1985 | |

(List continued on next page.)

OTHER PUBLICATIONS

U.S. patent application Ser. No. 09/553,689, filed Apr. 21, 2000.
U.S. patent application Ser. No. 09/556,192, filed Apr. 21, 2000.
U.S. patent application Ser. No. 09/556,110, filed Apr. 21, 2000.
U.S. patent application Ser. No. 09/616,168, filed Jul. 14, 2000.
U.S. patent application Ser. No. 09/616,172, filed Jul. 14, 2000.
U.S. patent application Ser. No. 09/616,559, filed Jul. 14, 2000.
U.S. patent application Ser. No. 09/661,231, filed Sep. 13, 2000.
"The Woodworkers' Store", 1993–94 Catalog.

*Primary Examiner*—Dennis H. Pedder
(74) *Attorney, Agent, or Firm*—Westman, Champlin & Kelly, P.A.; S. Koehler

(57) ABSTRACT

An open roof construction for a vehicle having an opening in the fixed roof comprises a stationary part for attachment to the roof, having stationary guide rails on either side of the roof opening and slidable slides with operating mechanisms therein. A closure means supported by the operating mechanisms is adjustable between a closed position in which it closes the roof opening, and an open position in which it releases the roof opening at least partially. Each operating mechanism comprises a curve plate attached to the closure means and having a guide track with which a guide member connected to the slide may engage. The slide includes a height-adjustable part which is equipped with the guide member being in engagement with a further guide track in a curve part connected to the stationary part.

19 Claims, 5 Drawing Sheets

U.S. PATENT DOCUMENTS

| | | |
|---|---|---|
| 4,671,565 A | 6/1987 | Grimm et al. |
| 4,684,169 A | 8/1987 | Igel et al. .................... 296/221 |
| 4,725,092 A | 2/1988 | Reintges et al. ............ 296/221 |
| 4,752,099 A | 6/1988 | Roos et al. ................. 296/223 |
| 4,877,285 A | 10/1989 | Huyer |
| 5,020,849 A * | 6/1991 | Schlapp et al. ............. 296/221 |
| 5,058,947 A | 10/1991 | Huyer |
| 5,066,068 A | 11/1991 | Suzuki et al. ............... 296/221 |
| 5,259,662 A | 11/1993 | Huyer ........................ 296/221 |
| 5,527,085 A | 6/1996 | Ochiai et al. ............... 296/223 |
| 5,593,204 A | 1/1997 | Wahl et al. ................. 296/223 |
| 5,845,959 A | 12/1998 | Ueki .......................... 296/221 |
| 6,164,718 A * | 12/2000 | Stallfort ..................... 296/222 |
| 6,257,658 B1 * | 7/2001 | Nabuurs et al. ............ 296/223 |

FOREIGN PATENT DOCUMENTS

| | | | |
|---|---|---|---|
| EP | 0 218 890 | 4/1987 | |
| EP | 0343750 A1 | 11/1989 | |
| EP | 0517318 A1 | 12/1992 | |
| EP | 0747249 A1 | 12/1996 | |
| EP | 0899140 A1 | 3/1999 | |
| FR | 2 495 068 | 6/1982 | |
| FR | 2 527 995 | 12/1983 | |
| JP | 0278422 | 12/1986 | |
| JP | 104734 * | 3/1991 | ................. 296/221 |
| JP | 404297323 | 10/1992 | |

* cited by examiner

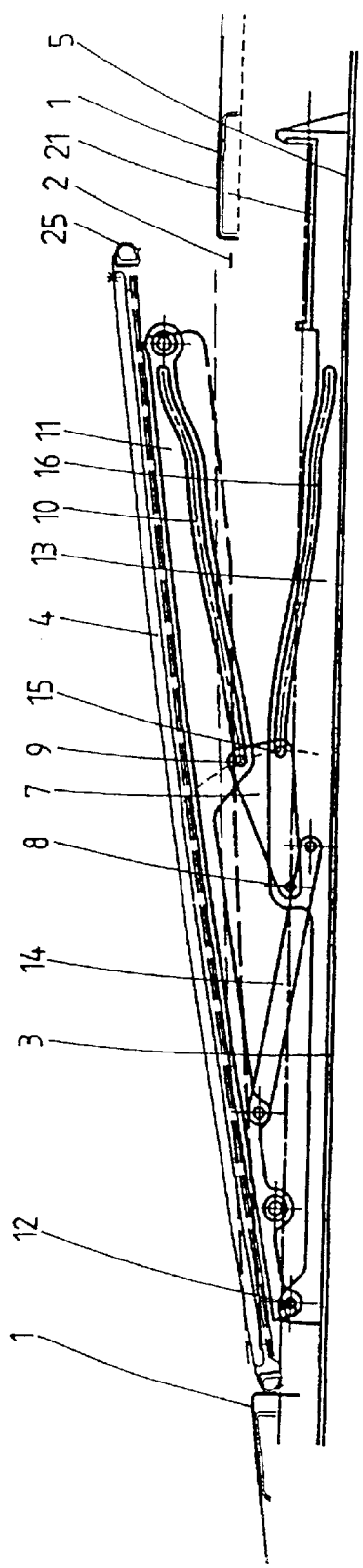
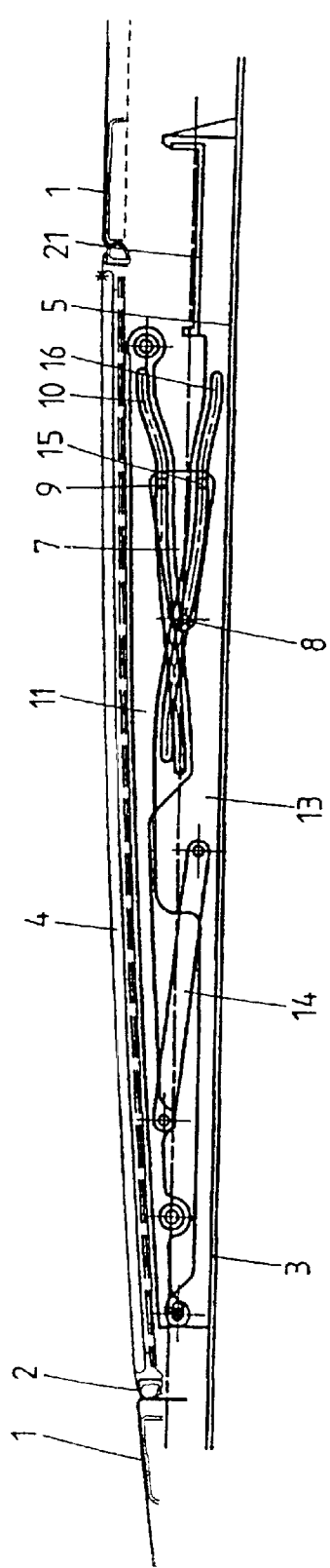
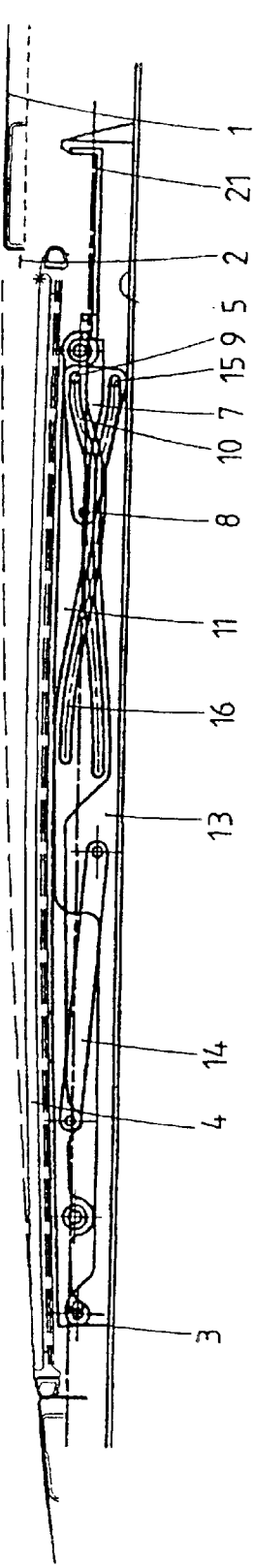
fig.1
fig.2
fig.3

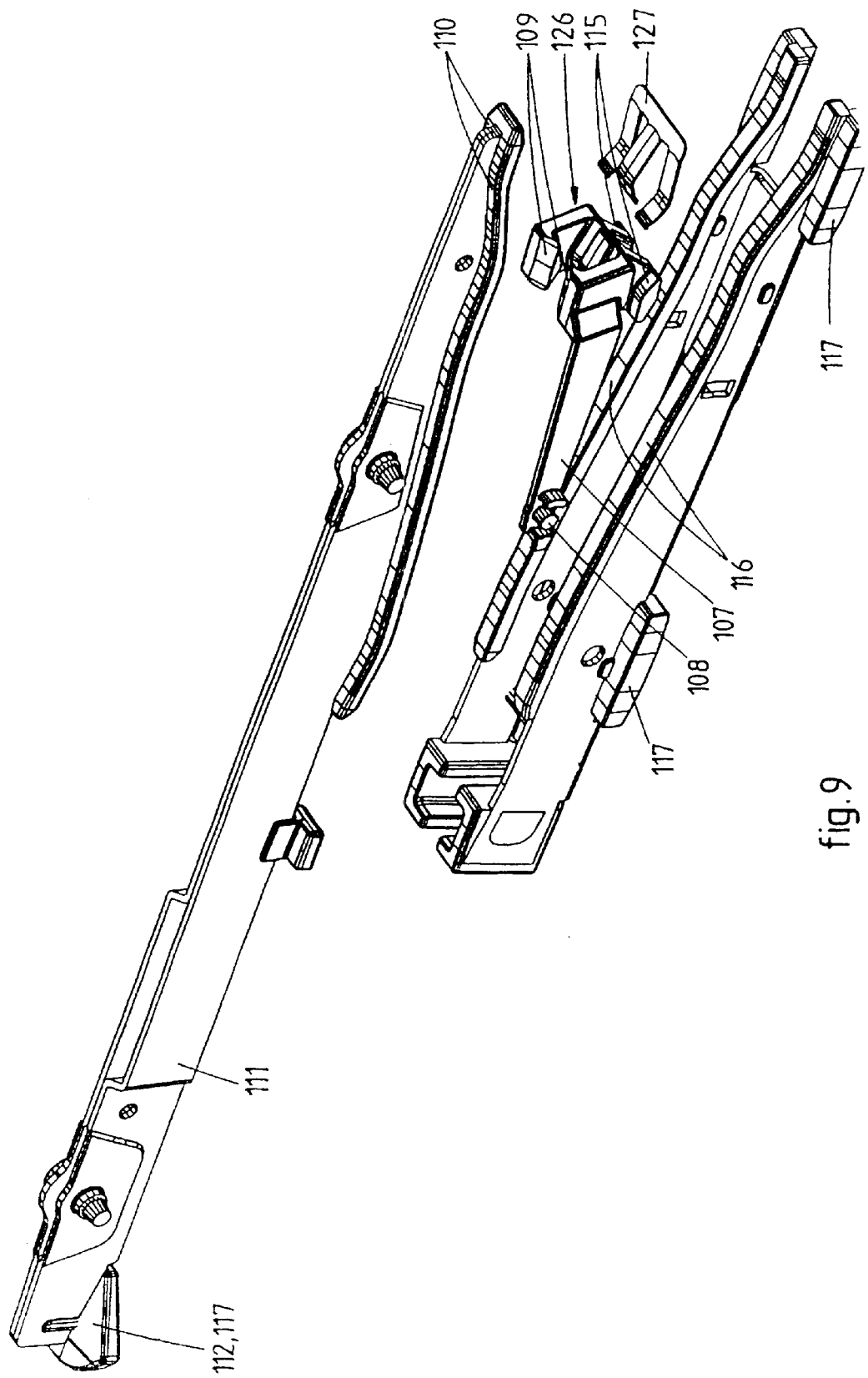

OPEN ROOF CONSTRUCTION FOR A VEHICLE

CROSS-REFERENCE TO RELATED APPLICATION

This application is a national stage filing under 35 U.S.C 371 and hereby claims priority of PCT/NL99/00469, filed Jul. 20, 1999 and published in English.

BACKGROUND OF THE INVENTION

The invention relates to an open roof construction for a vehicle having an opening in the fixed roof, comprising a stationary part for attachment to the roof, having stationary guide rails on either side of the roof opening and slidable slides with operating mechanisms, a closure means supported by the operating mechanisms, which is adjustable between a closed position, in which it closes the roof opening, and an open position, in which it releases the roof opening at least partially, wherein each operating mechanism comprises a curve plate attached to the closure means and having a guide track with which a guide member connected to the slide is in engagement.

Open roof constructions of this kind are already known, for example from DE-A-39 30 756 and DE-A-36 03 314. These known roof constructions comprise a lifting lever which converts movement of the slide into vertical movement of the closure means. By means of said lifting lever the vertical movement of the closure means is magnified in comparison with panels wherein a fixed pin moves in a slot in the curve plate and thus adjusts the closure means in vertical direction. The lifting lever cannot support the panel independently without being loaded in flexure, which makes it sensitive to forces being exerted on the panel, which may in turn lead to play. In principle, the guide track of the curve plate on the panel itself does not contribute towards the vertical movement of the closure means.

DE-C-39 08 645 discloses an open roof construction wherein the lifting lever is guided by an additional guide pin, which is disposed between the two ends of the lifting lever. The use of such a guided lifting lever makes it possible to achieve a lower overall height of the operating mechanism.

The object of the present invention is to provide an improved open roof construction of the kind mentioned in the introduction.

SUMMARY OF THE INVENTION

In order to accomplish that objective, the open roof construction according to the invention is characterized in that the slide includes a height-adjustable part which is equipped with the guide member, and which is in engagement with a further guide track having a vertical component in a curve part connected to the stationary part.

A significant advantage of this is the fact that the electric motor will maintain a constant number of revolutions while adjusting the panel, which makes the mechanism sound reliable and which produces the least amount of noise. In addition, it has a beneficial effect on the operational life of the motor. In parts of the path of movement of the panel where the resistance is relatively high, for example when the panel is moved through the closed position, a larger transmission ratio will be selected temporarily, as a result of which the panel will move more slowly through this difficult part. The occupants of the vehicle will hardly notice this.

BRIEF DESCRIPTION OF THE DRAWINGS

The invention will be explained in more detail hereafter with reference to the drawings, which schematically show embodiments of the invention.

FIGS. 1, 2 and 3 are longitudinal sectional views of the embodiment of the open roof construction according to the invention in three different positions thereof.

FIG. 9 is an exploded view, wherein the parts of the mechanism of FIG. 8 are shown separately.

DETAILED DESCRIPTION OF THE ILLUSTRATIVE EMBODIMENTS

Figure 4:
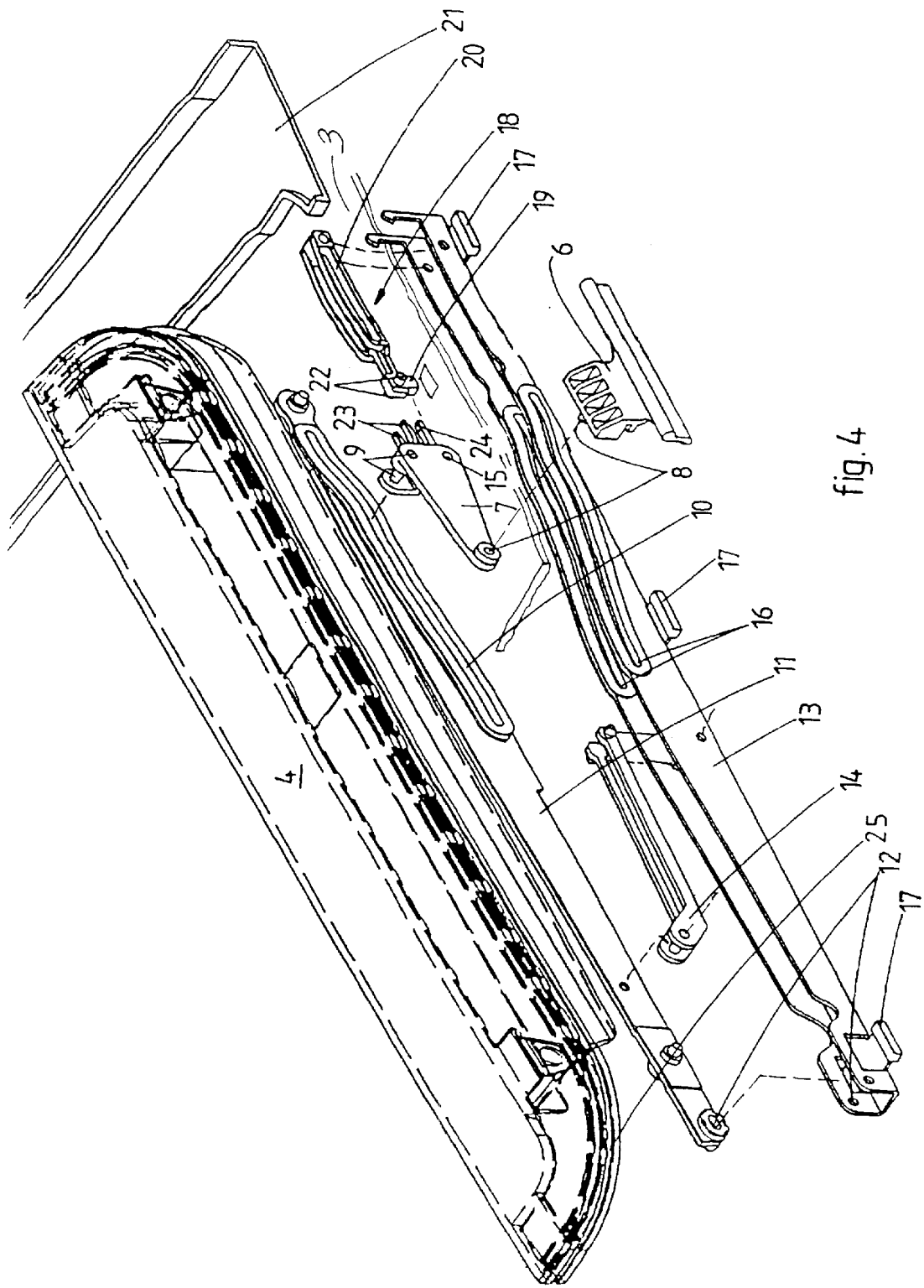
FIG. 4 is a perspective, exploded view of the main parts of the operating mechanism of the open roof construction of FIG. 1.

Comparable parts in the various embodiments are indicated by the same reference numerals, preceded by the number one hundred. The open roof construction as shown in the drawings forms the subject matter of further patent applications of the same date, whose contents are considered to be incorporated herein by reference.

The drawings, and in the first instance FIGS. 1–3, show an embodiment of the open roof construction according to the invention, which is built into a vehicle whose fixed roof 1 is provided with a roof opening 2. The open roof construction comprises a frame 3 or different stationary part, which can be attached to the fixed roof 1. Said frame supports, in a manner yet to be described in more detail, a closure means 4, which is capable of selectively closing the roof opening 2 or releasing it at least partially.

In the illustrated embodiment, the open roof construction is in the form of a so-called sliding-tilting roof, wherein the closure means 4 is a rigid panel, which can on the one hand be moved from the closed position in the roof opening 2 (FIG. 2) to a ventilating (FIG. 1) position, in which it slopes upwards, and which can on the other hand be moved downwards and subsequently rearwards from said closed position to a position under fixed roof 1 (FIG. 3).

In order to make said movements possible, panel 4 is provided on either side with an operating mechanism, one of which is shown in the drawings, whereby it should be understood, however, that the same mechanism is provided in mirror symmetry therewith at the other longitudinal edge of panel 4. The operating mechanisms are accommodated in guide rails 5, which are mounted on frame 3 or integrated therein and which extend on either side of roof opening 2 and rearwards thereof under fixed roof 1. Each operating mechanism is driven by a slide 6 (see FIGS. 4–7), which is guided in guide rail 5 and which can be moved in guide rail 5 by means of a pull-push cable (not shown) or other connecting element which is connected to driving means such as an electric motor, a hand crank or the like.

Mounted on slide 6 is a height-adjustable part, in the form of an arm 7 in this embodiment, which is connected to slide 6 by means of a horizontal, transversely extending pivot 8. Arm 7 extends in rearward direction from pivot 8 on slide 7. Arm 7 of slide 6 is provided at its end remote from said pivot with a first guide member in the form of a guide pin 9, which is in engagement with a guide track in the form of a guide slot 10 formed in a curve plate 11 which is mounted on the underside of panel 4 and which extends in the longitudinal direction thereof.

On the front side, curve plate 11 is provided with a horizontal, transversely extending pivot 12, by means of which panel 4 can pivot about its front side. Pivot 12 is supported near the front side of a curve slide 13 yet to be described in more detail. The hole in the curve plate 11 through which the pivot pin of pivot 12 extends is slightly elongated so as to allow movement of pivot 12 in longitudinal direction upon pivoting of panel 4, whereby said movement in longitudinal direction is determined by a connecting arm 14, which is pivotally connected to curve slide 13 and curve plate 11.

Besides guide pin 9, arm 7 also comprises a second guide member in the form of a guide pin 15, which is of double construction in the present embodiment, which is in engagement with two parallel guide slots 16 in curve slide 13, which function as guide tracks. Guide slots 10 and 16 are in essence equally long, whilst they are furthermore positioned at least substantially above each other, extending at substantially the same inclination, albeit in opposite directions. As can be seen in FIGS. 4–7, curve slide 13 is of U-shaped cross-section, with the legs of said U extending symmetrically relative to a longitudinal axis, each leg being provided with a guide slot. 16. The mutual distance between said legs of curve slide 13 is selected so that curve plate 11 fits therebetween, and curve plate 11 and curve slide 13 and also guide slots 10, 16 thereof can overlap partially upon pivoting of curve plate 11 under the influence of the movement of guide pin 9 of arm 7 through guide slot 10.

Guide pins 9 and 15 are spaced a small vertical distance apart, and together with pivot 8 they form a triangle of forces which is capable of providing very stable support for panel 4. The arrangement of guide pins 9 and 15 (a connecting line extends substantially perpendicularly to panel 4 in every position) enables a practically direct transmission of forces on panel 4 to the guide rail via arm 7, without any significant flexural forces being exerted thereon. Guide pins 9 and 15 could coincide, if desired.

As is shown in FIGS. 4–7, curve slide 13 is provided with sliding shoes 17, via which curve slide 13 can be moved in guide rail 5. Curve slide 13 is only moved for the purpose of moving panel 4 rearwards to a position under fixed roof 1, during other movements of panel 4 in vertical direction curve slide 13 must remain stationary and slide 6 must move with respect to curve slide 13. Slide 6 and curve slide 13 will move as one unit when panel 4 is moved in rearward direction.

Special locking means are provided for locking and releasing curve slide 13, which locking means are shown in particular in FIG. 4. As said figure shows, a locking member 18 is provided near the rear end of curve slide 13. Said locking member 18 comprises a locking cam 19, which is pivotally connected to curve slide 13 by means of a springing body 20. A transversely extending water drain 21, which is mounted above curve slide 13 and which moves along with curve slide 13, acts on springing body 20 and loads locking cam 19 in downward direction. In the extreme forward position of curve slide 13, locking cam 19 can come into engagement with a recess (not shown) formed in guide rail 5, in order to lock curve slide 13 with respect to guide rail 5 and release the locking engagement or connection between curve slide 13 and slide 6.

For this latter purpose, locking member 18 is provided on either side above locking cam 19 with connecting pins 22, which can mate with forks 23 present at the rear end of arm 7 of slide 6. Said forks 23 each possess a connecting slot 24 comprising a first entry portion and an connecting portion, which slopes upwards in forward direction, albeit barely noticeably, which on the one hand functions as a wedge for lifting locking cam 19 out of the locking recesses in guide rail 5 upon movement through the connecting portion of connecting slot 24. On the other hand, coupling pins 22 are retained in the connecting portion of connecting slot 24 when locking cam 19 has moved out of the locking recess in guide rail 5 and locking cam 19 is retained in vertical direction, and also in horizontal direction, with respect to arm 7.

The operation of the illustrated operating mechanism of the open roof construction according to the invention will now be explained in more detail with reference to FIGS. 1–3 and 5–7.

Figures 5, 6, 7:
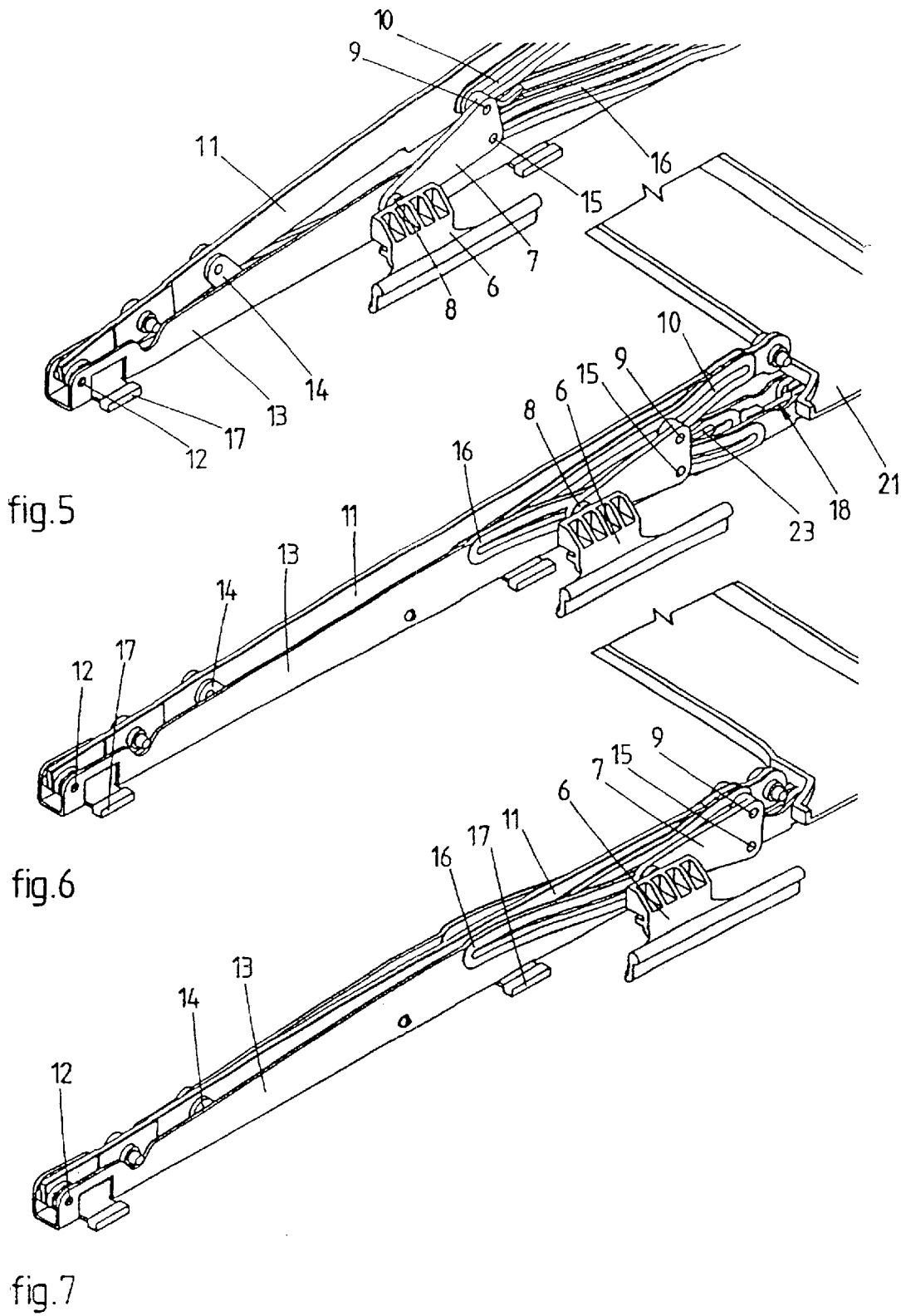
FIGS. 5, 6 and 7 are perspective views of the mechanism of FIG. 4, showing the mechanism in positions corresponding to those shown in FIGS. 1–3.

FIGS. 2 and 6 show panel 4 in the closed position, and in FIG. 2 the guide pins 9 and 15 are positioned in relatively horizontal portions of guide slots 10 and 16. This implies that panel 4 is moved relatively slowly at a large transmission ratio upon movement of guide pins 9, 15 through their associated guide slots 10, 16. The reason for this is that the resistance is relatively high in this part of the path of movement of panel 4, in particular because the seal 25 surrounding panel 4 is clamped in position in roof opening 2. In spite of this resistance the load exerted on the driving motor as a result of the resistance of the operating mechanism is not large, due to the large transmission ratio, so that the driving motor can move slide 6 without any problem.

When slide 6 is moved forward from the position as shown in FIG. 2, arm 7 is pulled forward and guide pins 9 and 15 are moved forward through their associated guide slots 10 and 16. Curve plate 11 of panel 4 and curve slide 13 are wedged apart, as it were, whereby the maximum ventilating position is reached in FIG. 1. Guide pins 9 and 15 are present at the front end of the associated guide slots 10, 16 in this position. The point of engagement between arm 7 and panel 4 is positioned a relatively large distance away from pivot 12 on the front side of panel 4 in this position, so that a stable support of panel 4 is provided and a relatively short portion of panel 4 is unsupported. Thus, relatively large forces on panel 4 can be resisted without any risk of vibrations or the like. The direct transmission of forces from panel 4 to frame 3 also contributes thereto.

During the forward movement of slide 6 from the position as shown in FIG. 2 to the position as shown in FIG. 1, arm 7 has pivoted about pivot 8 because guide pin 9 has moved upwards through guide slot 10 with respect to slide 6. The pivoting movement of panel 4 is caused both by the manner in which the two guide slots 10 and 16 extend and by the movement of guide pins 9, 15 in the direction of the front pivot 12 of panel 4. The guide slots 10 and 16 thereby extend in such a manner that no leverage is required in order to obtain sufficient lifting height after all. As a rule, the slope at which the guide slots 10, 16 extend will be slightly greater in that case.

In FIG. 3, the arm has moved rearwards from the closed position as shown in FIG. 2, guide pins 9 and 15 have moved to the rear end of their associated guide slots 10 and 16, and panel 4 has pivoted maximally downwards about pivot 12. In this position curve plate 11 and curve slide 13, and also guide slots 10, 16, overlap to a significant degree, because curve plate 11 has been moved between the legs of U-shaped curve slide 13. As a result of this overlap, panel 4 can be moved to a position quite close to guide rail 5 of frame 3, as a result of which the overall height of the open roof construction can be very low, thus minimizing the loss of headroom in the interior of the vehicle. The rear portion of guide slots 10, 16 is so shaped that the panel will first be moved slowly, then quickly and subsequently slowly again upon constant movement of slide 6.

During the last part of the movement of slide 6 to the position according to FIG. 3, locking cam 19 is lifted from the locking recess in guide rail 5 by the connecting slots 24 in forks 23, and connecting pins 22 move through connecting slots 24 and are eventually locked in the sloping part of said connecting slots 24. After a slight rearward movement of curve slide 13, which is made possible by releasing the locking engagement by locking cam 19, locking cam 19 is locked in vertical direction by guide rail 5 and a connection is made between slide 6 and curve slide 13 due to the fact that connecting pins 22 are retained in the sloping part of connecting slots 24, so that slide 6 and curve slide 13 move as one unit. Because connecting pins 22 engage in forks 23 of arm 7, panel 4, too, is locked against upward movement. Water drain 21 exerts a downward force on locking cam 19, so that when curve slide 13 returns to its frontmost position and locking cam 19 is positioned above the recess in guide rail 5, locking cam 19 will automatically move into the recess upon further forward movement of slide 6, due to the downward force of springing body 20.

Figure 8:
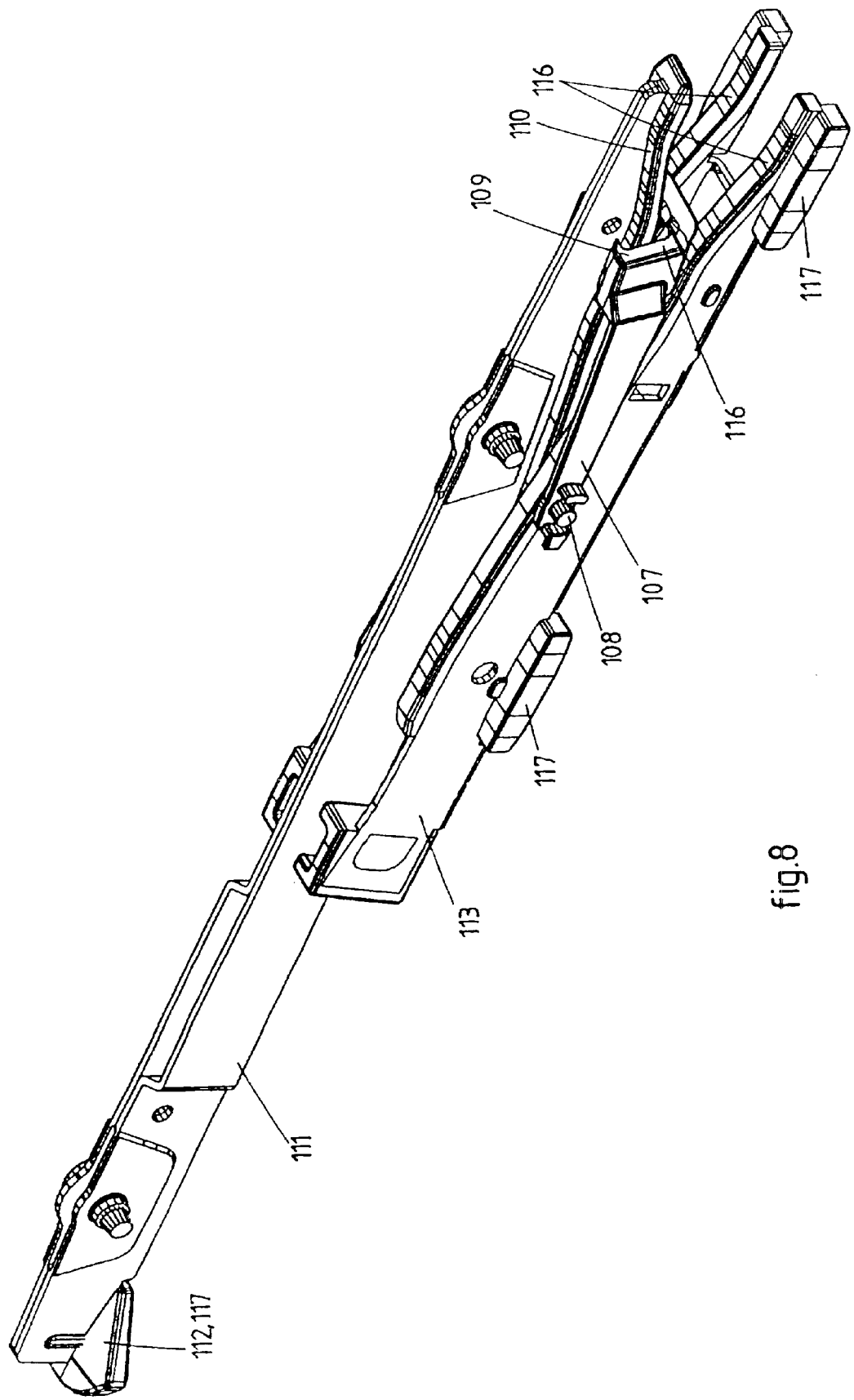
FIG. 8 is a perspective view of an alternative embodiment of an operating mechanism for an open roof construction according to the invention.

FIGS. 8 and 9 show a second embodiment of the operating mechanism according to the invention. In this embodiment, guide tracks 110 and 116 consist of laterally projecting ribs, whilst guide members 109 and 115 are made up of dual cams, which engage round the guide tracks. Both guide track 110 and guide track 116 are double guide tracks, whereby the ribs of guide track 110 extend outwards, whilst the ribs of guide track 110 extend towards each other. Curve plate 111 and curve slide 113 are both made of metal sheet, which has been given the desired shape by means of punching and bending operations. Guide tracks 110 and 116 are formed of gated plastic surrounding flanges on the lower edge of curve plate 111 and the upper edge of curve slide 113, respectively. Guide head 126 on arm 117 engages round curve plate 111 and in curve slide 113. In the lowermost position of panel 4, guide track 110 is largely accommodated in the curve slide. A tensioning member 127 with springing lips is mounted on guide head 126 in such a manner that said lips are accommodated between guide track 110 and guide member 109 and between guide track 116 and guide member 115 so as to bias said elements with respect to each other and thus prevent rattling. The slide to which arm 107 is connected is not shown in FIGS. 8 and 9.

FIGS. 8 and 9 do furthermore show that the front sliding shoe 117 formed on the front end of curve plate 111 also functions as a pivot 112 for panel 4. To that end, sliding shoe 117 slightly tapers off in forward and rearward direction from a central portion so as to permit tilting movement in the guide rail (not shown).

From the foregoing it will be apparent that the invention provides an open roof construction which on the one hand is remarkable for its simplicity and small overall height, and which on the other hand provides a stable support and advantageous driving characteristics.

The invention is not restricted to the above-described embodiment as shown in the drawing, which can be varied in several ways without departing from the scope of the invention.

Thus, the invention can also be used with other types of open roof constructions, such as lifting roofs, spoiler roofs and other kinds of roofs comprising panels or other types of single or multiple closure means. The height-adjustable part of the slide could also be in engagement with the guide slots of the closure means and the stationary part via one guide pin or other type of guide member. The guide members and guide tracks could also be kinetically reversed.

What is claimed is:

1. An open roof construction for a vehicle having an opening in the fixed roof, comprising:
    a stationary part for attachment to the roof, having a stationary guide rail on each side of the roof opening;
    a slide on each guide rail, each slide having an operating mechanism; and
    a closure element supported by the operating mechanisms, which is adjustable between a closed position, in which it closes the roof opening and an open position, in which it releases the roof opening at least partially, wherein each operating mechanism comprises a curve plate attached to the closure element and having a first guide track with which a guide member connected to the slide is in engagement, at least along part of the path of movement of the closure element, wherein the slide includes a height-adjustable part which is equipped with the guide member, and which is also in engagement with a second guide track having a vertical component in a curve part connected to the stationary part, wherein the height-adjustable part of the slide is provided with an arm which is connected to said slide via a horizontal pivot, which arm extends rearwards from said slide.

2. The open roof construction according to claim 1, wherein an electric motor is provided for driving each slide and wherein at least one of the guide tracks extends in such a manner that the load exerted on the electric motor by the operating mechanism will be at least substantially constant during the entire movement of the slide.

3. The open roof construction according to claim 1, wherein the curve plate on the closure element and the curve part of the stationary part, and the guide tracks thereof, can overlap in a vertical direction in lower positions of the closure element.

4. The open roof construction according to claim 1, wherein a second guide member is formed on the height-adjustable part, which guide member is in engagement with the guide track in the curve part, wherein the two guide members are positioned at least substantially above each other, closely together, and wherein the guide tracks have at least substantially the same length.

5. The open roof construction according to claim 1, wherein the two guide tracks extend along a path which varies for height and which deviates from a straight line.

6. The open roof construction according to claim 4, wherein the closure element comprises at least one rigid panel which can be pivoted obliquely upwards to a ventilating position and which can be moved rearwards to a position under the fixed roof, wherein the guide members occupy their frontmost position on the associated guide tracks in the ventilating position of the panel.

7. An open roof construction for a vehicle having an opening in the fixed roof, comprising:
    a stationary part for attachment to the roof, having at least one stationary guide rail extending along the roof opening;
    a slide slidable on the guide rail, the slide having an operating mechanism; and
    a closure element supported by the operating mechanism, which is adjustable between a closed position, in which it closes the roof opening, and an open position, in which it releases the roof opening at least partially, wherein said operating mechanism comprises a curve plate attached to the closure element and having a first guide track comprising two laterally extending ribs facing away from each other with which a guide member connected to the slide is in engagement, at least over part of the path of movement of the closure element, wherein the closure element is supported, via said guide member, by a second guide track comprising two laterally extending ribs facing each other having a vertical component on a curve part connected to said stationary part, wherein a part drivingly connects said slide to said guide member, wherein said guide member is arranged in a guide head engaging the ribs of the first and second guide tracks, wherein the guide head is positioned on a pivotable arm.

8. The open roof construction according to claim 7, wherein said curve part is a curve slide which can slide in said guide rail so as to effect the sliding movement of the closure element, in such a manner that said slide and said curve slide move jointly during sliding movements of the closure element and wherein the slide moves relative to the curve slide during movement in a vertical direction of the closure element.

9. The open roof construction according to claim 8, wherein said curve slide is fitted with a first locking member for locking the curve slide in position with respect to the guide rail during movement in vertical direction of the closure element, and the vertically movable part of the slide is provided with a connecting member for interconnecting the slide and the curve slide during sliding movement of the closure element.

10. An open roof construction for a vehicle having an opening in the fixed roof, comprising:
   a stationary part for attachment to the roof, having stationary guide rails on either side of the roof opening, with slides comprising operating mechanisms, which are to be moved by an electric motor, being present therein; and
   a closure element supported by the operating mechanisms, which is adjustable between a closed position, in which it closes the roof opening, and an open position, in which it releases the roof opening at least partially, wherein the transmission ratio of the operating mechanism is variable along the path of movement of the slide, in such a manner that the load exerted on the electric motor by the operating mechanism is at least substantially constant during the entire movement of the slide.

11. An open roof construction for a vehicle having an opening in the fixed roof, comprising:
   a stationary part for attachment to the roof, having stationary guide rails on either side of the roof opening;
   a slide slidable on each guide rail, each slide having an operating mechanism;
   a closure element supported by the operating mechanisms, which is adjustable between a closed position, in which it closes the roof opening and an open position, in which it releases the roof opening at least partially, wherein each operating mechanism comprises a curve plate attached to the closure element and having a guide track with which a guide member connected to the slide is at least partially in engagement, wherein said slide includes a height-adjustable part which is in engagement with said slide, said closure element and an element held fixed to said stationary part in three points, wherein the points of the height-adjustable part where it is in engagement with the closure element and the stationary part are positioned at least substantially inline with each other, in a direction substantially perpendicular to the closure element.

12. The open roof construction according to claim 11, wherein two guide members are formed on said height-adjustable part, wherein a first guide member is in engagement with a guide track formed in said curve plate on said closure element and a second guide member is engagement with a guide track on the element attached to said stationary part and wherein the two guide members are positioned at least substantially inline with each other, in a direction substantially perpendicular to the closure element.

13. An open roof construction for a vehicle having an opening in the fixed roof, comprising:
   a stationary part for attachment to the roof, having stationary guide rails on either side of the roof opening;
   a slide slidable on each guide rail, each slide having an operating mechanism; and
   a closure element supported by the operating mechanisms, which is adjustable between a closed position, in which it closes the roof opening and an open position, in which it releases the roof opening at least partially, wherein each operating mechanism comprises a curve plate attached to the closure element and having a first guide track with which a guide member connected to the slide is in engagement, at least along part of the path of movement of the closure element, wherein the slide includes a height-adjustable part which is equipped with the guide member, and which is also in engagement with a second guide track having a vertical component in a curve part connected to the stationary part, wherein a second guide member is formed on the height-adjustable part, which second guide member is in engagement with the second guide track in the curve part, wherein a line connecting the two guide members extends substantially perpendicular to the closure element in all positions thereof, and wherein the guide tracks have substantially the same length.

14. An open roof construction for a vehicle having an opening in the fixed roof, comprising:
   a stationary part for attachment to the roof, having stationary guide rails on either side of the roof opening;
   a slide slidable on each guide rail, each slide having an operating mechanism; and
   a closure element supported by the operating mechanisms, which is adjustable between a closed position, in which it closes the roof opening and an open position, in which it releases the roof opening at least partially, wherein each operating mechanism comprises a curve plate attached to the closure element and having a first guide track with which a guide member connected to the slide is in engagement, at least along part of the path of movement of the closure element, wherein the slide includes a height-adjustable part which is equipped with the guide member, and which is also in engagement with a second guide track having a vertical component in a curve part connected to the stationary part, wherein an electric motor is provided for driving each slide, and wherein at least one guide track extends in such a manner that the load exerted on the electric motor by the operating mechanism will be at least substantially constant during the entire movement of the slide.

15. An open roof construction for a vehicle having an opening in the fixed roof, comprising:
   a stationary part for attachment to the roof, having at least one stationary guide rail extending along the roof opening;

a slide slidable on the guide rail and having an operating mechanism; and a closure element supported by the operating mechanism, which is adjustable between a closed position, in which it closes the roof opening, and an open position, in which it releases the roof opening at least partially, wherein said operating mechanism comprises a curve plate attached to the closure element and having a first guide track with which a guide member connected to the slide is in engagement, at least over part of the path of movement of the closure element, wherein the closure element is supported, via said guide member, by a second guide track having a vertical component on a curve part connected to said stationary part, wherein a part drivingly connects said slide to said guide member, and wherein said closure element pivots about a front horizontal pivot member, wherein said part is an arm which is capable of pivoting movement about a horizontal pivot on said slide, and wherein an angle between a line through said front horizontal pivot member and engagement of said guide member with said first guide track and a line through said horizontal pivot on said slide and engagement of said guide member with said first guide track is an acute angle.

16. The open roof construction according to claim 15, wherein at least the guide track of the curve part is a double guide track.

17. The open roof construction according to claim 15, wherein said guide tracks are in the form of laterally extending ribs, on which said guide members engage.

18. The open roof construction according to claim 15, wherein at least one tensioning member is provided, which tensioning member spring-biases said guide members with respect to their associated guide tracks.

19. An open roof construction for a vehicle having an opening in the fixed roof, comprising:

a stationary part for attachment to the roof, having stationary guide rails on either side of the roof opening and slidable slides with operating mechanisms;

a closure means supported by the operating mechanisms, which is adjustable between a closed position, in which it closes the roof opening, and an open position, in which it releases the roof opening at least partially, wherein each operating mechanism comprises a curve plate attached to the closure means and having a guide track with which a guide member connected to the slide is at least partially in engagement, wherein said guide track comprises laterally extending ribs, on which said guide member engages, by means of cams engaging on either side thereof, wherein said curve plate is made of metal sheet, which is bent-over on the bottom side so as to form a flange, around which a plastic has been applied.

* * * * *